(12) United States Patent
Nochi

(10) Patent No.: US 10,728,415 B2
(45) Date of Patent: Jul. 28, 2020

(54) IMAGE PROCESSING APPARATUS AND IMAGE PROCESSING METHOD

(71) Applicant: Toshiba Tec Kabushiki Kaisha, Tokyo (JP)

(72) Inventor: Mutsumi Nochi, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/250,285

(22) Filed: Jan. 17, 2019

(65) Prior Publication Data

US 2019/0273838 A1 Sep. 5, 2019

(30) Foreign Application Priority Data

Mar. 1, 2018 (JP) .................. 2018-036771

(51) Int. Cl.
*H04N 1/21* (2006.01)

(52) U.S. Cl.
CPC ... *H04N 1/2166* (2013.01); *H04N 2201/0094* (2013.01)

(58) Field of Classification Search
CPC ............ H04N 1/2166; H04N 2201/0094
USPC ........................................ 358/1.16
See application file for complete search history.

(56) References Cited

U.S. PATENT DOCUMENTS

| 8,024,300 | B2 | 9/2011 | Hiraguchi |
| 2002/0184249 | A1* | 12/2002 | Shibata ............ H04N 1/32101 |
| 2007/0279706 | A1* | 12/2007 | Noda ................. H04N 1/00222 |
| | | | 358/474 |
| 2008/0018950 | A1* | 1/2008 | Kobayashi ............ H04N 1/387 |
| | | | 358/450 |
| 2008/0252943 | A1* | 10/2008 | Kozakura .......... H04N 1/00347 |
| | | | 358/474 |
| 2010/0128293 | A1* | 5/2010 | Tomita .................. G06F 40/166 |
| | | | 358/1.9 |
| 2014/0095557 | A1* | 4/2014 | Kamma ................ G06F 16/951 |
| | | | 707/827 |
| 2015/0229806 | A1* | 8/2015 | Okada .................. H04N 1/0036 |
| | | | 358/448 |

FOREIGN PATENT DOCUMENTS

JP 2009124594 A 6/2009

* cited by examiner

*Primary Examiner* — Allen H Nguyen
(74) *Attorney, Agent, or Firm* — Kim & Stewart LLP

(57) ABSTRACT

According to an embodiment, an image processing apparatus includes: an image reading device and a controller. The controller assigns a variable character string to a file identifier for each page of image files generated by the image reading device, and repeatedly assigns the same character string to the file identifier for each number of unit pages. Further, the controller determines a file name of each of the image files by using the file identifier.

10 Claims, 10 Drawing Sheets

|  | CHARACTER STRING SET | | | | | |
|---|---|---|---|---|---|---|
| ATTRIBUTE NAME | 1 | 2 | 3 | 4 | 5 | ... |
| UPPERCASE LETTER | A | B | C | D | E | ... |
| LOWERCASE LETTER | a | b | c | d | e | ... |
| NUMERICAL NUMBER | 1 | 2 | 3 | 4 | 5 | ... |
| KATAKANA | ア | イ | ウ | エ | オ | ... |
| ⋮ | ⋮ | ⋮ | ⋮ | ⋮ | ⋮ | ... |

Fig.3

AAAAA-001-a.xxx
AAAAA-001-b.xxx
AAAAA-002-a.xxx
AAAAA-002-b.xxx
AAAAA-003-a.xxx
AAAAA-003-b.xxx
AAAAA-004-a.xxx
AAAAA-004-b.xxx
⋮

Fig.5

AAAAA−001−a.xxx
AAAAA−001−b.xxx
AAAAA−001−c.xxx
AAAAA−001−d.xxx
AAAAA−002−a.xxx
AAAAA−002−b.xxx
AAAAA−002−c.xxx
AAAAA−002−d.xxx
⋮

Fig.6

AAAAA-001-a.xxx
AAAAA-002-b.xxx
AAAAA-003-a.xxx
AAAAA-004-b.xxx
AAAAA-005-a.xxx
AAAAA-006-b.xxx
AAAAA-007-a.xxx
AAAAA-008-b.xxx
⋮

Fig.9

| SCAN FILE NAME | FOLDER NAME |
|---|---|
| AAAAA-001-a. xxx <br> AAAAA-001-b. xxx | AAAAA-001 |
| AAAAA-002-a. xxx <br> AAAAA-002-b. xxx | AAAAA-002 |
| AAAAA-003-a. xxx <br> AAAAA-003-b. xxx | AAAAA-003 |
| AAAAA-004-a. xxx <br> AAAAA-004-b. xxx | AAAAA-004 |

Fig.10

IMAGE PROCESSING APPARATUS AND IMAGE PROCESSING METHOD

CROSS-REFERENCE TO RELATED APPLICATIONS

This application is based upon and claims the benefit of priority from the prior Japanese Patent Application No. 2018-036771, filed on Mar. 1, 2018, the entire contents of which are incorporated herein by reference.

FIELD

An embodiment to be described here generally relates to an image processing apparatus and an image processing method.

BACKGROUND

In an image processing apparatus such as a multifunction peripheral (MFP) and a scanner, an auto document feeder (ADF) is often used when reading a plurality of documents at once. The ADF is an apparatus for automatically feeding a document. In the scanning processing using the ADF, a plurality of documents can be read at once. Regarding an image file of the scanned document (hereinafter, referred to as the "scan file"), typically, a document image of one page is assigned to one file. For example, in the case where 10 documents in single-sided printing are read by using the ADF at once, 10 scan files are generated. Further, in the case where the ADF has a double-sided reading function, by reading 10 documents in double-sided reading, 20 scan files are generated.

In the past, these scan files have been given file names using sequential numbers and alphabets. Therefore, the file names are arranged in order in units of one page, which makes it easy to perform management in units of one page. However, it takes a lot of effort to manage the files in units of a plurality of pages in some cases.

BRIEF DESCRIPTION OF THE DRAWINGS

FIG. 3 is a data configuration diagram showing a specific example of an identifier table according to the embodiment.

FIG. 5 is a diagram showing a specific example of the file name according to the embodiment.

FIG. 6 is a diagram showing a specific example of the file name according to the embodiment.

FIG. 9 is a diagram showing a specific example of the file name of the modification according to the embodiment.

FIG. 10 is a diagram showing a specific example of a folder name according to the embodiment.

DETAILED DESCRIPTION

Figure 1:
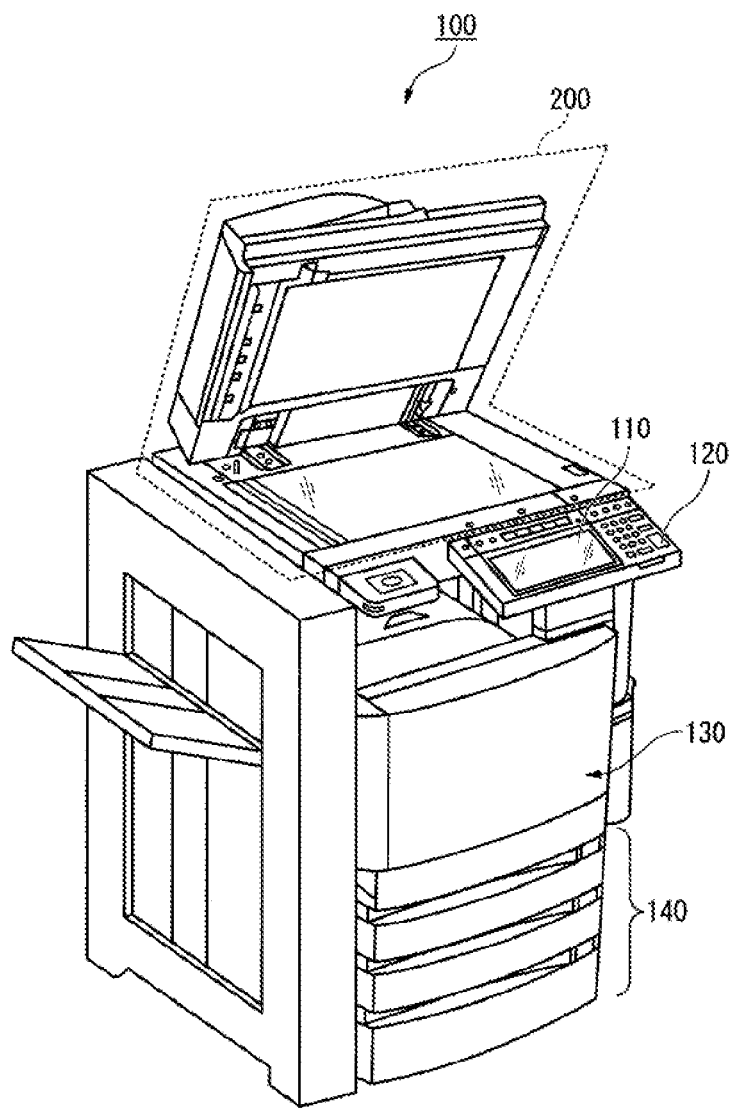
FIG. 1 is an outer appearance view of the entire configuration example of an image processing apparatus according to an embodiment.

According to one embodiment, an image processing apparatus includes: an image reading device; a storage device; and a controller. The image reading device reads images from a plurality of pages of document sheets, and generates a plurality of image files by assigning an image of one page to each of the image files. The storage device stores the image files, a file name being assigned to the image files for each page, the file name having a file identifier including an assigned character string. The controller assigns a variable character string to the file identifier for each page and repeatedly assigns the same character string to the file identifier for each number of unit pages. Further, the controller determines the file name of each of the image files by using the file identifier.

Hereinafter, an image processing apparatus and an image processing method according to an embodiment will be described with reference to the drawings. In the drawings, the same reference symbols represent the same or similar units.

(Embodiment)

FIG. 1 is an outer appearance view of the entire configuration example of an image processing apparatus 100 according to an embodiment. The image processing apparatus 100 is, for example, an image forming apparatus such as a multifunctional machine. The image processing apparatus 100 includes a display 110, a control panel 120, a printer 130, a sheet housing device 140, and an image reading device 200. Note that the printer 130 of the image processing apparatus 100 may be an apparatus that fixes a toner image or an ink-jet apparatus.

The image processing apparatus 100 reads images formed on a plurality of pages of document sheets to generate an image file including digital data. In the following description, the image file will be referred to as the scan file. The document sheet is, for example, paper on which characters, images, or the like as a document are written. The document sheet may be any medium as long as it can be read by the image processing apparatus 100.

The display 110 is an image display device such as a liquid crystal display or an organic electro luminescence (EL) display. The display 110 displays various types of information regarding the image processing apparatus 100.

The control panel 120 includes a plurality of buttons. The control panel 120 receives an operation of a user. The control panel 120 outputs a signal corresponding to an operation performed by the user to a controller of the image processing apparatus 100. Note that the display 110 and the control panel 120 may be configured as an integrated touch panel.

The printer 130 forms an image on a printing sheet on the basis of image information generated by the image reading device 200 or image information received via a communication path. Hereinafter, the printing sheet will be referred to simply as the sheet in some cases. The printer 130 forms an image by, for example, processing to be described below. An image forming device of the printer 130 forms an electrostatic latent image on a photosensitive drum on the basis of the image information. The image forming device of the printer 130 causes a developer to adhere to the electrostatic latent image to form a visible image on the photosensitive drum. As a specific example of the developer, a toner is used. A transfer device of the printer 130 transfers the visible image (toner image) to the sheet. A fixing device of the printer 130 heats and presses the sheet to fix the toner image on the sheet. Note that the sheet on which an image is to be formed may be a sheet housed in the sheet housing device 140 or may be a manually fed sheet.

The sheet housing device 140 houses sheets to be used for image formation in the printer 130.

The image reading device 200 reads image information of the document sheet to be read, as brightness and darkness of light. The image reading device 200 stores the read image information. The stored image information may be transmitted to another image processing apparatus via a network. The stored image information may be used to form an image on a sheet by the printer 130. The image reading device 200 may include an ADF. In this case, reading processing may be executed by using, as one document set, a plurality of pages of document sheets set in the ADF at once.

Figure 2:
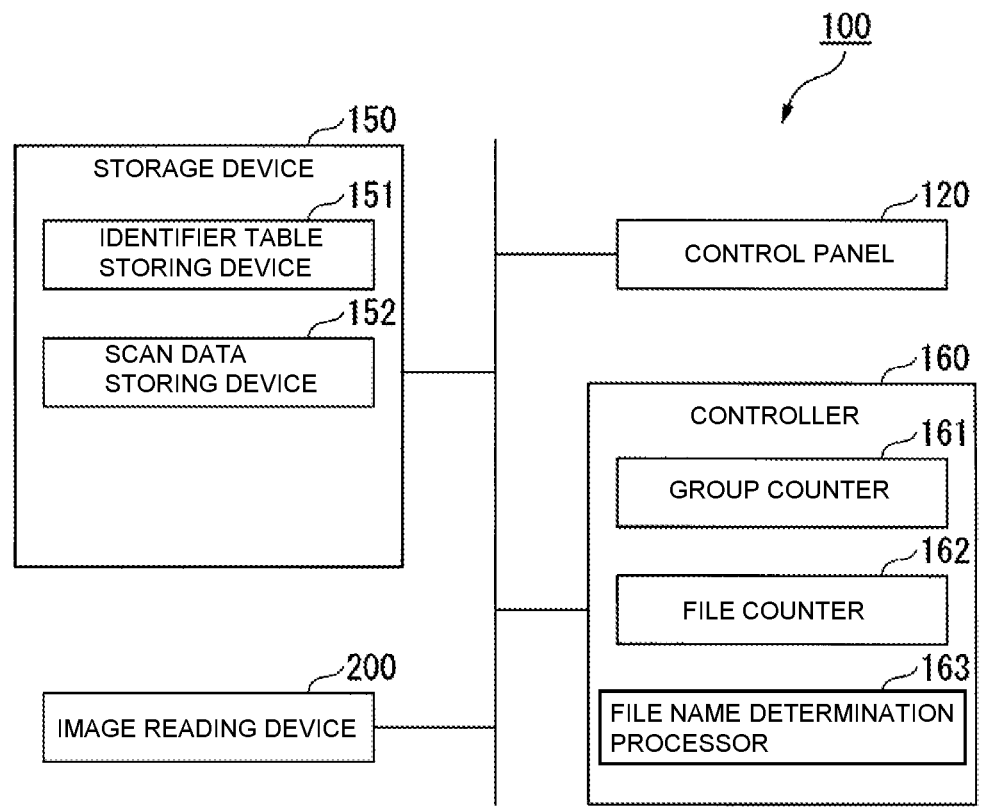
FIG. 2 is a schematic block diagram showing a configuration of functional blocks of the image processing apparatus according to the embodiment.

FIG. 2 is a schematic block diagram showing an example of a control configuration of the image processing apparatus 100 according to the embodiment. The image processing apparatus 100 includes, as the control configuration, the control panel 120, a storage device 150, a controller 160, and the image reading device 200.

The storage device 150 includes a storage device such as a magnetic hard disc device or a semiconductor storage device. The storage device 150 functions as an identifier table storing device 151 and a scan data storing device 152.

The identifier table storing device 151 stores an identifier table in advance. The identifier table is a table in which character strings of identifiers that can be used for the file name of the file to be generated by the image processing apparatus 100 are registered.

FIG. 3 is a data configuration diagram showing a specific example of the identifier table. In the identifier table, an attribute name and a character string set are registered in association with each other in advance. The attribute name is a name to be a primary key for specifying the character string set. For example, the character string set including uppercase letters is registered in association with the attribute name "uppercase letter". In the character string set including the uppercase letters, for example, uppercase letters, i.e., "A", "B", "C", . . . , are registered in alphabetical order.

The scan data storing device 152 stores the data of the scan file and the file name in association with each other.

The controller 160 includes a processor such as a central processing unit (CPU). The CPU executes a program, thereby causing the controller 160 to function as a group counter 161, a file counter 162, and a file name determination processor 163. The controller 160 operates as the above-mentioned functions to determine the file name of the scan file generated by the image reading device 200.

Figure 4:
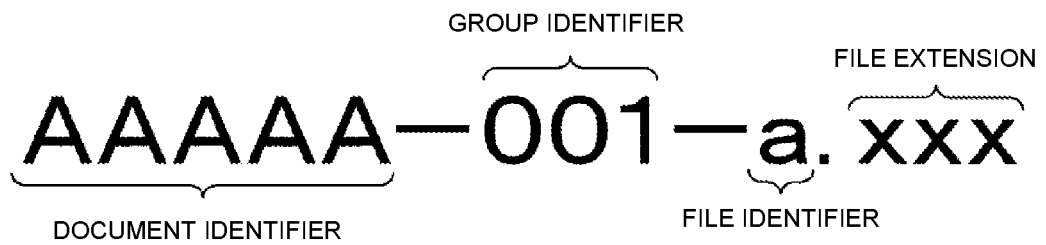
FIG. 4 is a diagram schematically showing a file name determined by a controller according to the embodiment.

FIG. 4 is a diagram schematically showing a file name determined by the controller 160. The file name includes character strings of a document identifier, a group identifier, a file identifier, and a file extension. The document identifier is a character string commonly given to all the scan files generated from one document set.

The group identifier is a character string forming a part of the file name given to a plurality of files generated from one document set. The group identifier is a character string indicating one or more groups included in the document set. Scan files whose number corresponds to the number of unit pages belong to one group. For example, in the case where the number of unit pages is "two", two scan files belong to each group. As the character used for the group identifier, for example, the character string set registered in the identifier table storing device 151 may be used. The character string set having the attribute to be used may be set by a user or administrator in advance or determined by the image processing apparatus 100 in advance.

The file identifier is a character string forming a part of the file name given to a plurality of files generated from one document set. The file identifier is a character string indicating one or more files included in the group. Scan files whose number corresponds to the number of unit pages belong to one group. The file counter 162 assigns a variable character string to the file identifier for each page, and repeatedly assigns the same character string to the file identifier for each number of unit pages. For example, in the case where the number of unit pages is "two", two scan files belong to each group. The file identifier is an identifier for identifying each file that belongs to one group. As the character used for the file identifier, for example, the character string set registered in the identifier table storing device 151 may be used. The character string set having the attribute to be used may be set by a user or administrator in advance or determined by the image processing apparatus 100 in advance.

The file extension is a character string determined corresponding to the file form of the scan file. The file extension is determined as the character string corresponding to the file form selected by a user, for example.

In the example of FIG. 4, the document identifier, the group identifier, and the file identifier are connected with a hyphen "-", and the file extension is added thereto, thereby forming a file name. Note that the order of the identifiers is not limited to the example of FIG. 4. For example, the character strings of the file identifier, the group identifier, and the document identifier may be arranged from the left in the stated order, thereby forming a file name. Further, the character that connects the identifiers is not limited to a hyphen. For example, as the character that connects the identifiers, an underscore "_" may be used. Further, it does not necessarily need to use the character that connects the identifiers. In this case, the identifiers may be continuously connected without any other character string being inserted between them.

Next, the function of the controller 160 will be described. The group counter 161 determines the group identifier, corresponding to predetermined conditions. The group counter 161 updates the group identifier every time the number of unit pages is counted by the file counter 162 to be described later. In the case where the group identifier is a numerical number, the group counter 161 may update the numerical number of the group identifier sequentially to a larger numerical number. In the case where the group identifier is an alphabet, the group counter 161 may update the alphabet of the group identifier sequentially to the next character. For example, in the case where the group identifier is "001", the next group identifier may be "002". For example, in the case where the group identifier is "A", the next group identifier may be "B". The group counter 161 may reset the group identifier when the file name determination processing on the one document set is finished.

The file counter 162 determines the file identifier, corresponding to the predetermined conditions. The file counter 162 updates the file identifier every time the scan file is generated. When the number of generated scan files in one group corresponds to the number of unit pages, the file counter 162 resets the value. In the case where the file identifier is a numerical number, the file counter 162 may update the numerical number sequentially to a larger numerical number. In the case where the file identifier is an alphabet, the file counter 162 may update the alphabet of the file identifier sequentially to the next character. For example, in the case where the file identifier is "001", the next file identifier may be "002". For example, in the case where the file identifier is "A", the next file identifier may be "B". It is desirable that the character of the file identifier to be used is one whose attribute is different from that of the group identifier. For example, in the case where the group identifier is an uppercase letter (uppercase alphabet), it is desirable that the file identifier is a lowercase letter (lowercase alphabet), a numerical number, hiragana, or katakana.

The file name determination processor 163 determines the file name by using the group identifier and the file identifier determined by the group counter 161 and the file counter 162, respectively. Specifically, the file name determination processor 163 determines the file name by connecting the document identifier, the group identifier and the file identifier acquired at that time, and the file extension.

FIG. 5 is a diagram showing a specific example of the file name in the case where the number of unit pages is "two", the document identifier is "AAAAA", the group identifier is a three-digit Arabic numeral, and the file identifier is a lowercase alphabet. In FIG. 5, the document identifier, the group identifier, and the file identifier are assigned to the generated scan files in order from the top. The document identifier does not change with any file name. Since the number of unit pages is "two", the group identifier is changed for every two files. Since the number of unit pages is "two", the file identifier is reset for every two files.

FIG. 6 is a diagram showing a specific example of the file name in the case where the number of unit pages is "four", the document identifier is "AAAAA", the group identifier is a three-digit Arabic numeral, and the file identifier is a lowercase alphabet. In FIG. 6, the document identifier, the group identifier, and the file identifier are assigned to the generated scan files in order from the top. The document identifier does not change with any file name. Since the number of unit pages is "four", the group identifier is changed for every four files. Since the number of unit pages is "four", the file identifier is reset for every four files.

Figure 7:
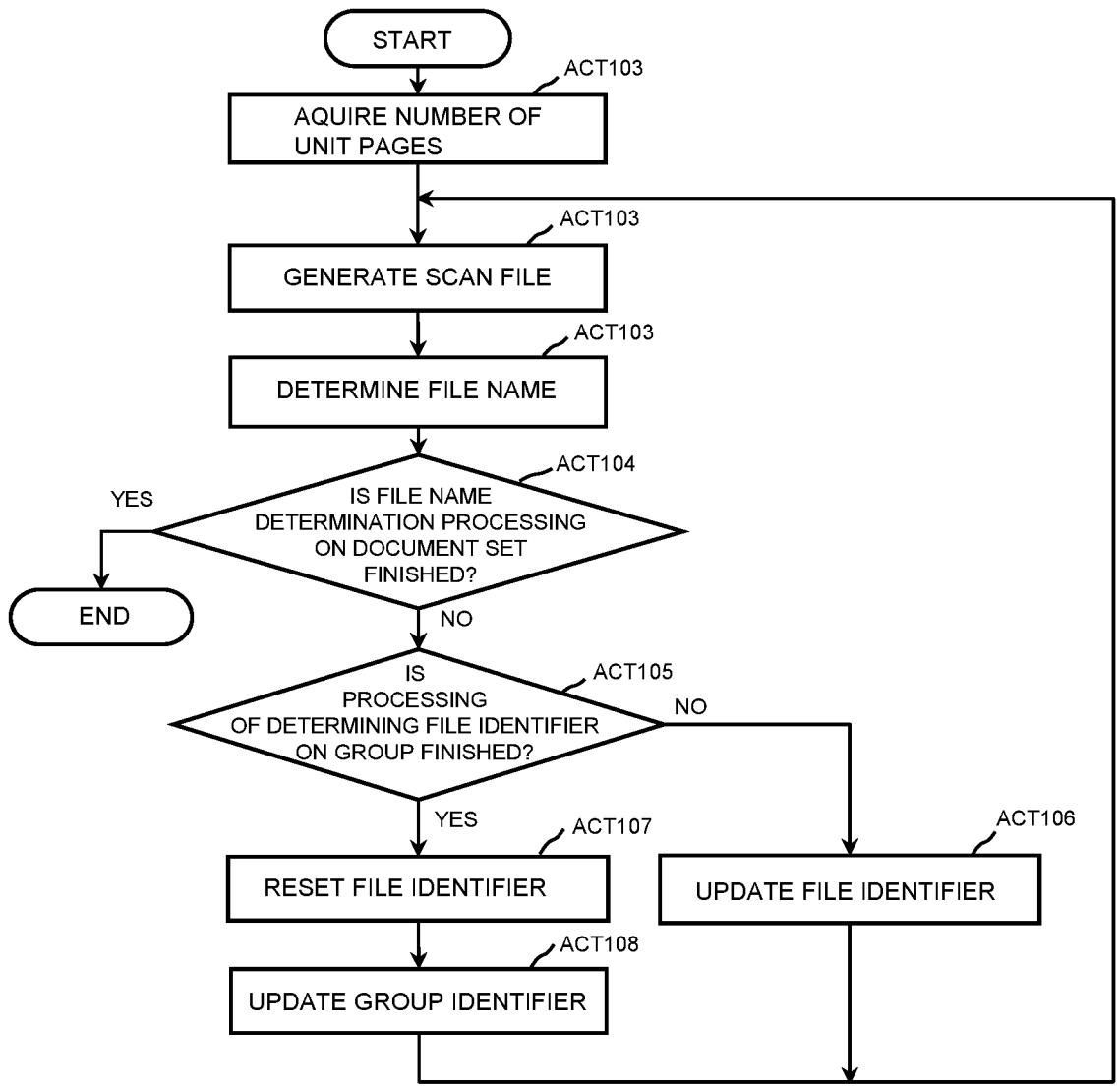
FIG. 7 is a flowchart showing a specific example of processing executed by the image processing apparatus according to the embodiment.

FIG. 7 is a flowchart showing a specific example of the processing executed by the image processing apparatus 100. First, in ACT101, the file counter 162 acquires the value of the number of unit pages. Specifically, the control panel 120 receives an input operation of a user corresponding to the value of the number of unit pages. The file counter 162 acquires the value of the number of unit pages input via the control panel 120. In response to the acquisition of the value of the number of unit pages, the file name determination processor 163 initializes the group counter 161 and the file counter 162. The group counter 161 and the file counter 162 each acquire a value corresponding to the initialization. The value corresponding to the initialization is the group identifier and the file identifier corresponding to the file name given to the scan file of the first page. In the examples shown in FIG. 5 and FIG. 6, the value corresponding to the initialization is "001" for the group identifier and "a" for the file identifier.

Next, in ACT102, the controller 160 generates a scan file. Specifically, the image reading device 200 sequentially reads an image of a document from a document set (a plurality of pages of document sheets), according to an operation of a user. The controller 160 causes the image reading device 200 to generate a scan file on the basis of the read image. In ACT103, the file name determination processor 163 determines the file name at this time by using the group identifier and the file identifier determined by the group counter 161 and the file counter 162, respectively. The file name determination processor 163 gives the determined file name described above to the scan file generated by the image reading device 200.

Next, in ACT104, the controller 160 determines whether or not the file name determination processing on one document set is finished. In the case where the file name determination processing on the document set is finished (YES in ACT104), i.e., reading of the set document sheets is finished, the processing by the image processing apparatus 100 is finished. Meanwhile, in the case where the file name determination processing is not finished (NO in ACT104), the processing of the controller 160 proceeds to ACT105. In ACT105, the controller 160 (file counter 162) determines whether or not the processing of determining the file identifier on one group is finished. Whether or not the processing of determining the file identifier on one group is determined on the basis of whether or not scan files whose number corresponds to the number of unit pages have been generated from the start of the current group. In other words, it is determined on the basis of whether or not the scan files whose number corresponds to the number of unit pages have been generated after resetting the value of the file counter 162. In the case where the processing of determining the file identifier on the group is not finished (NO in ACT105), the processing of the controller 160 proceeds to ACT106. In ACT106, the controller (file counter 162) updates the file identifier. Meanwhile, in the case where the processing of determining the file identifier on the group is finished (YES in ACT105), the processing of the controller 160 proceeds to ACT107. In ACT107, the controller 160 (file counter 162) resets the file identifier. Then, the file counter 162 instructs the group counter 161 to update the group identifier. In ACT108, the group counter 161 updates the group identifier. After the processing of ACT106 or ACT108, the processing of the controller 160 returns to the processing of ACT102.

According to the image processing apparatus 100 configured as described above, the group identifier and the file identifier are assigned to the individual scan files, corresponding to the number of unit pages designated by the user. Therefore, it is easy to determine, on the basis of the scan file name, which group in the units of a plurality of pages the scan file belongs to. Further, it is easy to determine which number in the group the scan file is. Therefore, it is possible to reduce the effort necessary for file management in units of a plurality of pages.

Further, in the case where the number of unit pages is set to "two" and both sides of the document sheet are read, it is possible to easily determine, on the basis of the file identifier, whether it is a front side image or a rear side image. In such a use case, the number of unit pages may be automatically set to "two" in response to double-sided reading being set, without causing the user to input the number of unit pages.

(Modification)

Figure 8:
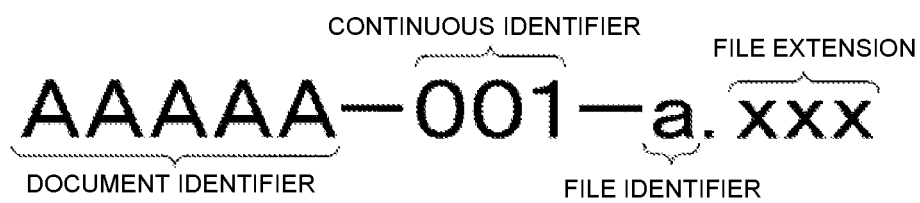
FIG. 8 is a diagram showing a modification of a scan file name according to the embodiment.

FIG. 8 is a diagram showing a modification of the scan file name. In the example of FIG. 8, the controller 160 includes a continuous counter 164 instead of the group counter 161. The continuous counter 164 continuously updates the value in one document set regardless of the number of unit pages. That is, a continuous identifier represents the number of scan files generated in the document set. The file name determination processor 163 may determine the file name by using the document identifier, the continuous identifier, the file identifier, and the file extension.

FIG. 9 is a diagram showing a specific example of the file name in the case where the number of unit pages is "two", the document identifier is "AAAAA", the continuous identifier is a three-digit Arabic numeral, and the file identifier is a lowercase alphabet. In FIG. 9, the document identifier, the continuous identifier, and the file identifier are assigned to the generated scan file in order from the top. As shown in FIG. 9, the document identifier does not change with any file name. The continuous identifier is changed for each file regardless of the number of unit pages. Since the number of unit pages is "two", the file identifier is reset for every two files.

Note that the examples shown in FIG. 8 and FIG. 9 are each merely a specific example using the continuous identifier. In the case of using the continuous identifier, for example, the file name may be determined by using the document identifier, the continuous identifier, the group identifier, and the file extension without using the file identifier. Further, for example, the file name may be determined by using the continuous identifier, the file identifier, and the file extension.

The document identifier may be designated by the user using the control panel 120. Further, the attribute of the character used for the group identifier, the continuous identifier, and the file identifier may be selected by the user from the attributes stored in the identifier table storing device 151.

The file name determination processor 163 may generate a file in which the scan file is to be stored, and determine the folder name of each folder, corresponding to the group identifier of the determined file name. FIG. 10 is a diagram showing a specific example of the folder name. As shown in FIG. 10, for example, the folder name may be determined by using the document identifier and the group identifier. The file name determination processor 163 sets a folder name in the generated folder, and causes the corresponding scan file to the folder. With this configuration, the scan files are grouped into folders for each group. Therefore, it is possible to further reduce the effort necessary for file management in units of a plurality of pages.

According to at least one embodiment described above, an image processing apparatus includes the file name determination processor 163 and can thus reduce the effort necessary for file management in units of a plurality of pages.

Note hat at least a part of the functions of the image processing apparatus 100 in the embodiment described above may be achieved by a computer. In such a case, a program for achieving those functions may be recorded in a computer-readable recording medium. Further, the functions of the image processing apparatus 100 may be achieved by causing a computer system to read and execute the program recorded in that recording medium. Note that the "computer system" herein includes the OS or hardware such as peripherals. Further, the "computer-readable recording medium" means a storage device such as a hard disk incorporated into the computer system. The storage device includes a portable medium such as a flexible disk, a magneto-optical disk, a ROM, a CD-ROM, a DVD-ROM, and a USB memory. Furthermore, the "computer-readable recording medium" may include a medium that dynamically holds a program for a short period of time. Specifically, the "computer-readable recording medium" is a network or the like, such as the Internet or communication wires used when a program is transmitted via a communication line such as a telephone line. Further, the "computer-readable recording medium" may include holds a program for a certain period of time. Specifically, the "computer-readable recording medium" is a volatile memory or the like inside a computer system, which is to be a server or a client. Further, the program described above may be a program for achieving part of the above-mentioned functions. Furthermore, the program described above may be a program capable of achieving the above-mentioned functions in combination with programs already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:
   an image reading device that:
      reads images from a plurality of pages of document sheets, and
      generates a plurality of image files by assigning an image of one page to each of the image files;
   a storage device that stores the image files, a file name being assigned to the image files for each page, the file name having a file identifier including an assigned character string; and
   a controller configured to:
      generate groups to which each of the plurality of image files belong,
      assign a variable character string to the file identifier for each image file of the plurality of image files belonging to a group and repeatedly assign the same character string to the file identifier in each group, and
      determine the file name of each of the image files by using the file identifier.

2. The image processing apparatus according to claim 1, wherein the controller includes:
   a file counter that assigns the variable character string to the file identifier, and
   a processor that determines the file name.

3. The image processing apparatus according to claim 2, wherein the file name further includes a document identifier including a character string commonly assigned to all the image files generated from a set of the plurality of pages of document sheets continuously read by the image reading device at once.

4. The image processing apparatus according to claim 3, wherein the processor determines the file name by using the document identifier including an invariable character string for the set of the plurality of pages of document sheets.

5. The image processing apparatus according to claim 2, wherein the file name further includes a group identifier including a character string assigned to each of the image files which are generated from a set of the plurality of pages of document sheets and belong to the same group.

6. The image processing apparatus according to claim 5, wherein the controller further includes a group counter that:
   acquires a number of pages of the set of the plurality of pages of document sheets designated by a user, and
   assigns a variable character string to the group identifier for each of the acquired number of pages.

7. The image processing apparatus according to claim 6, wherein the processor determines the file name by using the group identifier determined by the group counter.

8. The image processing apparatus according to claim 7, wherein the storage device stores folders, each folder including the image files to which file names including the same group identifier are assigned.

9. The image processing apparatus according to claim 8, wherein the processor sorts the image files into the folders according to group identifier.

10. An image processing method executed by an image processing apparatus, the method comprising:
- reading images from a plurality of pages of document sheets and generating a plurality of image files by assigning an image of one page to each of the image files;
- generating groups to which each of the plurality of image files belong;
- assigning a variable character string to a file identifier for each image file of the plurality of the image files and repeatedly assigning the same character string to the file identifier in each group;
- determining file names of the image files by using the file identifier; and
- storing the image files to which the determined file names are assigned.

* * * * *